(12) United States Patent
Meyer

(10) Patent No.: US 6,236,173 B1
(45) Date of Patent: May 22, 2001

(54) SERIES WOUND MOTOR

(75) Inventor: Christoph Meyer, Stuttgart (DE)

(73) Assignee: C. & E. Fein GmbH & Co., Stuttgart (DE)

( * ) Notice: Subject to any disclaimer, the term of this patent is extended or adjusted under 35 U.S.C. 154(b) by 0 days.

(21) Appl. No.: 09/525,712

(22) Filed: Mar. 14, 2000

(30) Foreign Application Priority Data

Mar. 18, 1999 (DE) .............................. 199 12 121

(51) Int. Cl.⁷ .................................................. H02K 23/08
(52) U.S. Cl. ............................................ 318/246; 318/756
(58) Field of Search .............................. 318/89, 154, 194, 318/756, 759, 762, 766, 246, 244, 245; 388/842, 843

(56) References Cited

U.S. PATENT DOCUMENTS

| 2,818,542 | 12/1957 | Linsley et al. |
| 4,144,482 | 3/1979 | Schwab. |
| 5,278,483 | * 1/1994 | Trumpler et al. .................. 318/756 |

FOREIGN PATENT DOCUMENTS

| 36 36 555 A1 | 5/1988 | (DE) . |
| 42 01 023 A1 | 7/1993 | (DE) . |
| 43 33 733 A1 | 4/1995 | (DE) . |
| 42 01 005 C2 | 8/1995 | (DE) . |
| WO 91/03866 | 3/1991 | (WO) . |
| WO 97/36367 | 10/1997 | (WO) . |

OTHER PUBLICATIONS

International Search report dated Oct. 09, 2000.

* cited by examiner

*Primary Examiner*—Khanh Dang
(74) *Attorney, Agent, or Firm*—Cummings & Lockwood

(57) ABSTRACT

A series wound commutator motor is disclosed which is particularly suited for an inverse-speed electric tool. A switch is provided for switching between a motor operation mode and a braking operation mode, wherein in motor operation at least one field coil is connected in series with an armature winding in a motor circuit fed with a voltage supply and wherein in braking operation the at least one field coil with the armature winding forms a closed braking circuit separated from the voltage supply. A mains-supplied transformer is provided whose secondary winding is connected in the braking circuit parallel to the at least one field coil. A transistor circuit is provided for controlling the current flowing in the braking circuit through the armature winding and the at least one field coil.

12 Claims, 2 Drawing Sheets

SERIES WOUND MOTOR

BACKGROUND OF THE INVENTION

The invention relates to a series wound commutator motor suitable for an electric power tool comprising switching means for switching between a motor operation mode and a braking operation mode, wherein in motor operation, at least a field coil and an armature winding are connected in series in a motor circuit fed with a voltage supply, and wherein in braking operation, the at least one field coil with the armature coil form a closed braking circuit separated from the voltage supply.

Such a series wound motor is disclosed in EP 0 471 038 B1. The known motor is particularly suited for driving inverse-speed electric power tools, such as right-angle grinders or circular saws and employs a multi-pole switching unit for switching between motor and braking operation modes. The switching unit short-circuits the motor in braking operation and the pole of the field coil is reversed. Means are also provided for limiting the braking current through the field coil. In this manner a smooth and rapid short-circuit braking through a separate auto-excitation is achieved. The armature or rotor is connected between the field coil and the commutating winding in motor operation, while in braking operation a current path is provided between the armature and the commutating winding. The current path comprises a Zener diode arrangement for limiting the braking current, such that only a predetermined amount of the braking current flows across the field coil.

In such motors, a reliable braking or retardation of the motor by switching into the braking operation is achieved, however, the use of commutating windings is more complicated and expensive.

Attempts have been made to avoid such problems by providing a capacitor to be charged in motor operation, which is then used for braking by auto-excitation (DE 42 01 023 A1). The known circuitry has the disadvantage that the stored charge can only be used once for introducing braking. If the charge is not sufficient to initiate braking, then braking cannot be expected to occur after capacitor discharge.

An object of the present invention is therefore to provide an improved series wound motor, which avoids the above disadvantages, in particular which is simple and inexpensive in structure and which guarantees a reliable braking when switching to braking operation.

SUMMARY OF THE INVENTION

According to the present invention, a series wound motor of the type mentioned is provided comprising a mains-powered transformer whose secondary winding is connected in the braking circuit parallel to the at least one field coil and a transistor circuit for controlling the current flowing in the braking circuit across the armature winding and the at least one field coil. The object of the present invention is solved completely in this manner.

A current is introduced in the braking circuit by means of the secondary winding of the transformer, which is sufficient to achieve a reliable initiation of braking. According to the present invention, a braking initiation when switching to the braking mode is guaranteed even in the most unfavourable situations.

The transistor circuit allows the braking current to be regulated, so that a large braking moment is available even in advanced stages of the braking process and provides a short braking time. In addition, the use of a diode arrangement connected in parallel to the field coil becomes superfluous.

Furthermore, the present invention allows complete elimination of commutating windings, which leads to a distinct simplification of the configuration and a cost reduction.

In an advantageous embodiment of the present invention, a field-effect transistor is provided, whose source and drain are connected in parallel to a load resistor in the braking circuit between the armature winding and the at least one field coil and which is triggered by a control voltage between the source and gate depending on the braking current.

With this, a sufficient voltage stability of the transistor is guaranteed, also in unfavourable circumstances, without the necessity of taking additional measures. By controlling the field-effect transistor between the source and gate depending on the braking current, it is achieved that the full braking current flows over the load resistor at the beginning of the retardation process and that the field-effect transistor is triggered at an advanced stage of braking, such that a high braking moment is generated even at the end.

In another preferred embodiment of the present invention, a voltage stabiliser is connected to the secondary winding of the transformer. The stabiliser is connected with a current-sensing resistor connected in series with the load resistor in the braking circuit to generate a pre-voltage between the source and gate of the field-effect transistor which is dependent on the braking current and is opposed to the voltage of the voltage stabiliser. The desired triggering of the field-effect transistor depending on the braking current is thus achieved in a particularly simple and reliable manner.

A Zener diode is provided as the voltage stabiliser in a preferred embodiment which is connected to the at least one field coil, one end of the secondary winding and the drop resistor at its anode and connected to the gate of the field-effect transistor and to the other end of the secondary winding at its cathode. The desired triggering of the field-effect transistor is therefore achieved with particularly simple means.

In another embodiment, a capacitor is connected in parallel to the Zener diode and the cathode of the Zener diode is connected to a diode at the secondary winding of the transformer. With this, the control voltage of the field-effect transistor is smoothed, which leads to a uniform braking or retardation effect.

According to a further embodiment of the present invention, the field-effect transistor and the drop resistor are connected to the cathode of a diode, the anode of which is connected to the armature winding in the braking circuit. Protection is provided against the theoretical possibility that an auto-excitation in the opposite direction could be initiated in an extremely unfavourable circumstance, which could lead to over-voltage between the drain and gate and thus destroy the field-effect transistor.

According to a further aspect of the present invention, the secondary winding of the transformer is connected via a rectifier to one pole of the armature winding. This ensures the initiation of the braking process in the desired direction, since the current across the secondary winding can only flow in one direction.

In a further embodiment of the present invention, a protective diode is provided to guard against arcing at the switching means between one pole of the armature winding and the other end of the secondary winding or the at least one field coil. This prevents damage of the transformer and the rectifier connected in series with the secondary winding should an arc develop on the switching unit during the switching process.

According to a further aspect of the present invention, the load resistor between the source and drain is provided as a commutating winding. This has advantages in some cases, especially for larger machines with a motor rating of 2000 Watt or more. Heat problems are avoided which could arise through the strong loading of the resistor. Such a measure however is not absolutely necessary for high performance motors. It is advantageous only in individual cases, since the production complexity and production costs would increase.

In an alternative embodiment of the present invention, the transistor circuit comprises a field-effect transistor which is connected with its source and drain to the at least one field coil via a diode in parallel and which regulates the current through the at least one field coil as a function of the current flowing through the armature winding. In this embodiment, the use of commutating poles can be completed eliminated.

A particular advantage is that the braking characteristic can be adjusted such that a slow continued running of the motor at the end of braking mode can be avoided, which occurs in conventional motors with commutating poles and auto-excitation braking, for example in EP-B1 0 471 038. For this purpose, the field-effect transistor is preferably connected with its gate to the two ends of the armature winding via a voltage divider.

A load resistor is preferably provided in the braking circuit, which is connected between an end of the armature winding and the at least one field coil. The field-effect transistor is connected with its drain at one end of the load resistor and its source with the upper end of the armature winding and the at least one field coil.

It will be understood that the above-mentioned features and those to be explained below are applicable not only in the given combinations but may also be applied in other combinations or alone without departing from the scope of the present invention as defined by the appending claims.

Preferred embodiments of the present invention are illustrated in the drawings and will be discussed in more detail below.

SHORT DESCRIPTION OF THE DRAWINGS

DETAILED DESCRIPTION OF THE PREFERRED EMBODIMENTS

Figure 1:
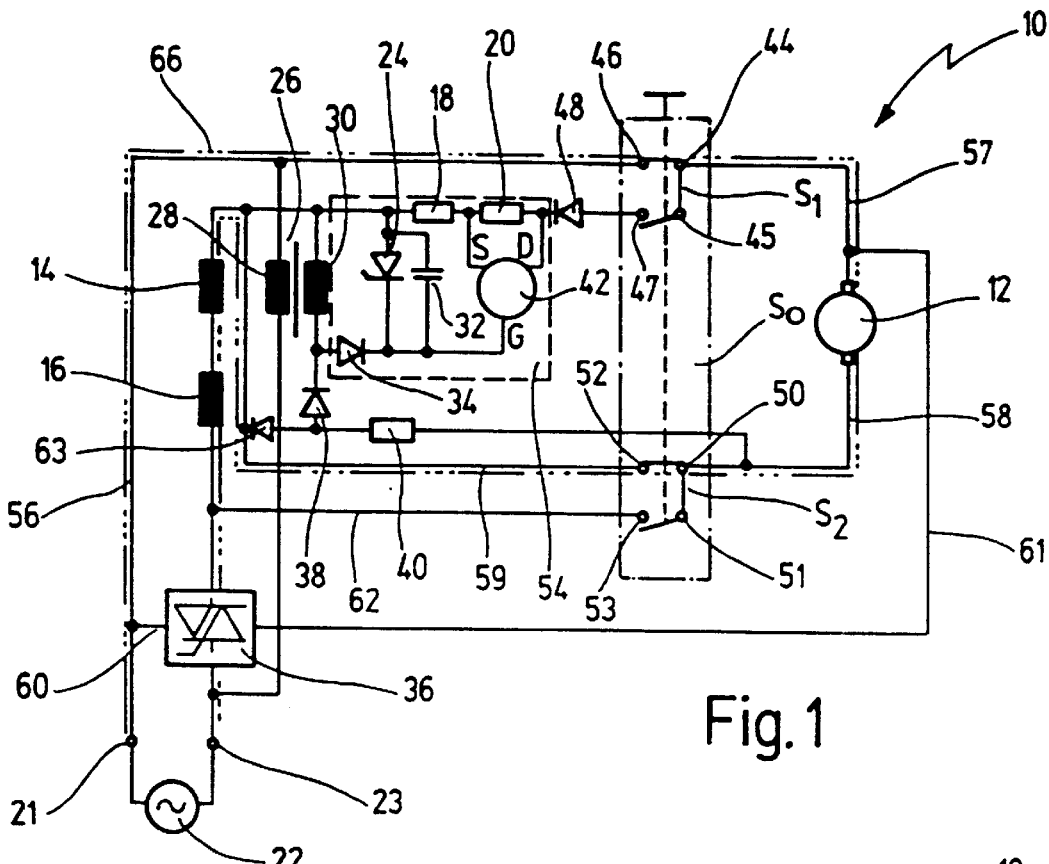
FIG. 1 shows a simplified circuit diagram of the motor in the motor operation mode according to the present invention.
Figure 2:
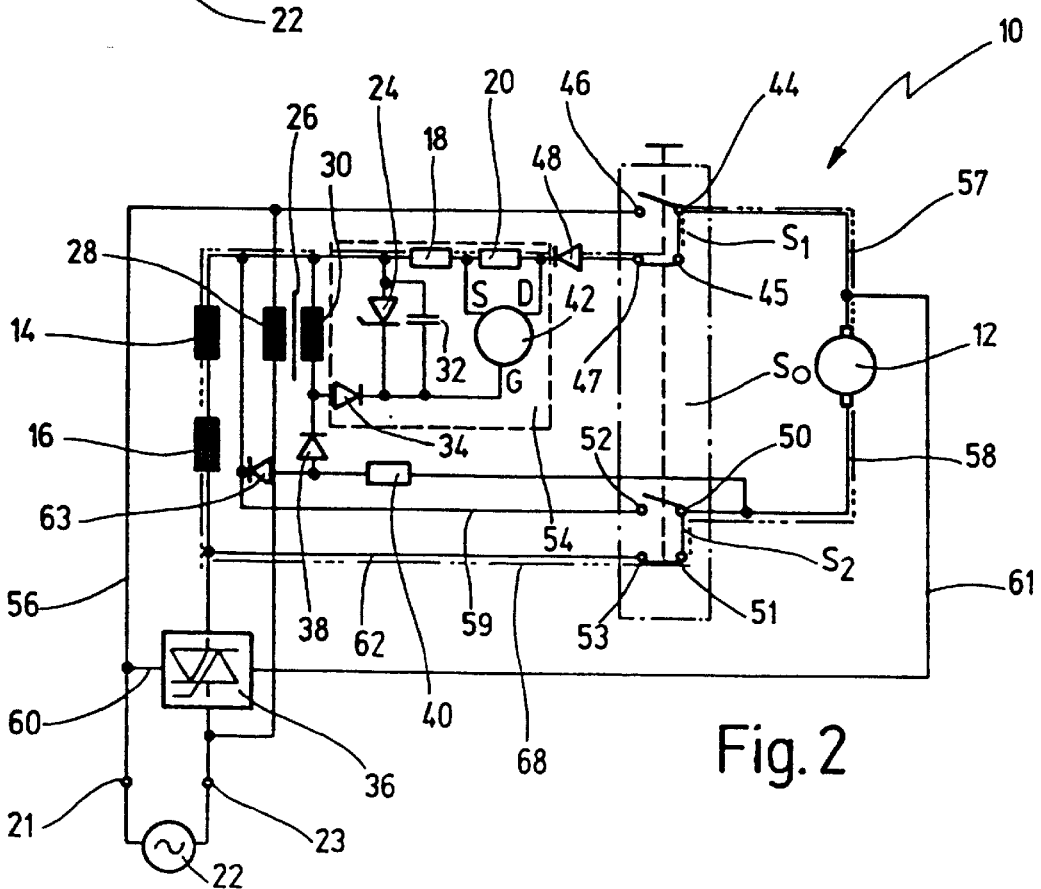
FIG. 2 shows the circuit of FIG. 1 in the braking operation mode.

A series wound motor according to the present invention is designated by numeral 10 in FIGS. 1 and 2. The motor 10 comprises an armature with an armature winding 12 which is connectable in motor operation according to FIG. 1 in series with a voltage supply 22 via a commutator (not shown) and only schematically indicated brushes by means of a switch $S_0$. The voltage supply delivers an alternating voltage of 230 Volt. The switch $S_0$ is a dual-pole switch with a first switching unit $S_1$ and a second switching unit $S_2$. The first pole of the voltage supply 22 is connected to a first contact 46 of the first switch unit $S_1$, via a line 56, which in turn is connected to two interconnected contacts 44 and 45 of the switch unit $S_1$ in the motor operation mode shown in FIG. 1 and is further connected with a pole of the armature winding 12 via a line 57. The second pole of the armature winding 12 is connected to two interconnected contacts 50 and 51 of the second switch unit $S_2$ via a line 58, which in turn are connected with a contact 52 in the shown switching condition and further with a first end of a first field coil 14 via a line 59. The first field coil 14 is connected in series with a second field coil 16 and with the second pole 23 of the voltage supply 22 by means of an electronic control unit 36. The control unit 36 is additionally connected with the first pole 21 of the voltage supply 22 via a control line 60 and with the contacts 44 and 45 of the first switch unit $S_1$ via a control line 61.

The electronic control unit 36 limits the starting current when switching on the motor, limits the rotary speed of the motor when idling and prevents the motor from starting when the voltage supply 22 is turned on while the switch $S_0$ is in the position as shown in FIG. 1. This known electronic control unit 36 is connected with the field coil 16 while the second field coil 14 is connected with the armature winding 12 via the switch $S_0$, which in turn is coupled to the other pole of the voltage supply 22. With this arrangement, interference suppression of the motor 10 is simplified.

The motor circuit 66 for motor operation mode, containing the armature winding 12, the two field coils 14, 16 and the electronic control 36 is illustrated in FIG. 1 by the dot-dashed line with three dots. The second contact 47 of the first switch unit $S_1$ connects to the anode of a diode 48, its cathode being connected to a load resistor 20 of about 12 Ohm. The load resistor 20 is connected at its other end to the field coil 14 via a current-sensing resistor 18 of about 0.3 Ohm. The field coil 14 is also coupled to the contact 52 of the second switch unit $S_2$ via the line 59.

Further, a transformer 26 is connected with its primary winding 28 between the two poles 21 and 23 of the voltage supply 22. The secondary winding 30 of the transformer 26 is connected at one end with the field coil 14 and the sensor resistor 18, while the other end of the secondary winding 30 is connected to the cathode of a diode 38, which at its other end is coupled to a line 58 leading to the armature winding 12 across a drop resistor 40 of about 12 Ohm.

To avoid damage to the transformer 26 or to the diode 38 in the case of arcing at the switch unit $S_2$ a protective diode 63 is connected to the drop resistor 40 and the diode 38. The cathode of the protective diode 63 connects to the contact 52 of the second switch unit $S_2$, so that an interconnection between the contacts 50, 52 and the drop resistor 40 exists via the protective diode.

A field-effect transistor 42 is provided for current control in braking operation across the diode 48, the load resistor 20, the current-sensing resistor 18 and the field coils 14 and 16, where the field-effect transistor 42 is connected with its drain between the diode 48 and the load resistor 20. The source is connected between the load resistor 20 and the current sensing resistor 18 and the gate to the cathode of a Zener diode 24 with a voltage of 5.8 or 6.8 Volt. The anode of the Zener diode 24 is coupled to the end of the secondary winding 30 which connects to the field coil 14 and the current-sensing resistor 18. The gate of the field-effect transistor 42 and the cathode of the Zener diode 24 are further connected to the other end of the secondary winding 30 of the transformer 26 via a diode 34, which is also connected to the diode 38. The diode 34 has the purpose of charging a smoothing capacitor 32 of about 2 microfarad, which is connected parallel to the Zener diode 24 to smooth the voltage across the Zener diode.

The field-effect transistor 42, the load resistor 40, the drop resistor 18, the Zener diode 24, the capacitor 32 and the diode 34 form a transistor circuit 54. The transistor circuit has the purpose of limiting the braking current flowing through the diode 48, the resistors 18 and 20 and the field coils 14 and 16 when the motor 10 is switched out of the position shown in FIG. 1 into the braking position shown in FIG. 2. In the braking mode shown in FIG. 2, the connection between the contacts 44 and 46 of the first switch unit $S_1$, is opened, while the connection between the contacts 45 and 47 of the second switch unit $S_1$ is closed. Further, the connection between the contacts 50 and 52 of the second switch unit $S_2$ is opened and the two interconnected contacts 50 and 51 of the second switch unit $S_2$ are connected to the contact 53. The contact 53 connects to a position between the second field coil 16 and the control unit 36 via a line 62.

The motor in the braking mode is separated from the voltage supply 22 by means of the open contacts 44 and 46. A closed braking circuit 68 is thus formed from the armature winding 12 over the contacts 45 and 47 of the first switch unit $S_1$, the diode 48, the resistors 18 and 20, the field coils 14 and 16 and the contacts 51 and 53 of the second switch unit $S_2$. The braking circuit is shown in FIG. 2 as the dot-dashed line with three dots.

The circuit functions in the following manner. When the motor 10 is switched from the position of FIG. 1 to the braking mode shown in FIG. 2, the retardation is reliably initiated through interaction with the rotating armature winding 12 by the voltage of the secondary winding 30 of the transformer, this voltage having been rectified by the diode 38.

Since the voltage drop across the current-sensing resistor 18 is opposite the voltage on the Zener diode 24, the field-effect transistor 42, which is connected in parallel with the source S and drain D of the load resistor 20, is controlled as a function of the braking current. At the beginning of the braking process, a short current pulse arises across the field-effect transistor 42, since initially only a small voltage drop occurs at the sensing resistor 18, so that the field-effect transistor 42 is briefly conductive. With immediate increase of the braking current, however, the voltage drop across the sensing resistor 18 increases, which is opposite in sign to the voltage across the Zener diode 24, so that the field-effect transistor 42 is turned off.

Only when the current across the resistors 18 and 20 goes below about 10 Ampere does the field-effect transistor 42 become conductive and bridges the load resistor 20 in such a manner that in the advanced stage of braking with decreasing braking voltage, the braking current is held at a high value due to the now reduced resistance despite the decreasing braking voltage.

The field-effect transistor 42 then remains in the conductive state, so that the braking process in its closing stage becomes distinctly strengthened. On the whole, a much more uniform braking or retardation is guaranteed and the braking effect especially at the end of the process is improved.

Compared to the known arrangement with commutating windings, a simpler configuration results, as the commutating windings can be totally relinquished, and furthermore, the Zener diodes connected anti-parallel to one another are eliminated. In addition, the armature current is reduced, which reduces commutator sparking.

When dimensioning a known arrangement of EP-B1 0 471 038 with commutating windings for a universal motor with a supply voltage of 230 Volt and a rating of about 2000 Watt, suitable for a large hand-held angle grinder, a braking current of about 25 Ampere results. According to the present invention, the same braking effect can be achieved with the armature current being reduced by about one half. When the field-effect transistor 42 is triggered in the advanced stage of braking, a higher braking current flows through the field coils 14 and 16, so that on the whole about the same braking power results.

Compared to the circuit known from DE-A1 42 01 023, the arrangement according to the present invention exhibits distinctly improved reliability of the introduction of retardation, as the voltage generated by the secondary winding is always present and enables the braking initiation every 20 ms for a normal mains frequency of 50 Hz. In contrast, the known circuit of DE-A1 42 01 023 provides only one opportunity of introducing braking, namely by a single discharge of the capacitor over the field coil. Should this current pulse not be sufficient to initiate the braking process, no further possibility exists after the capacitor has been discharged.

The diode 48 serves the single purpose of protecting against the purely theoretical case that due to an unfavourable remanence, when the braking process has not yet been initiated via the secondary winding 30 of the transformer 26, a counter voltage could be induced, which under unfavourable circumstances could destroy the field-effect transistor 42.

The transformer 26 need only be dimensioned for a very small rating, as it only serves as an auxiliary voltage for the braking introduction. As an example, a voltage of about 8 V can effectively be employed as the secondary voltage, where the current across the drop resistor of 15 Ohm is limited. Depending on the impedance of the secondary winding 30, the drop resistor could also be eliminated. A commercially available small transformer can be employed as the transformer 26.

The switching time of the field-effect transistor 42 is determined by the value of the Zener diode voltage on the one hand and the magnitude of the current-sensing resistor on the other hand. The larger the Zener diode voltage and the smaller the value of the sensor resistor, the earlier the braking introduction. The braking characteristic therefore can be adapted to the desired conditions for a given machine.

Figure 3:
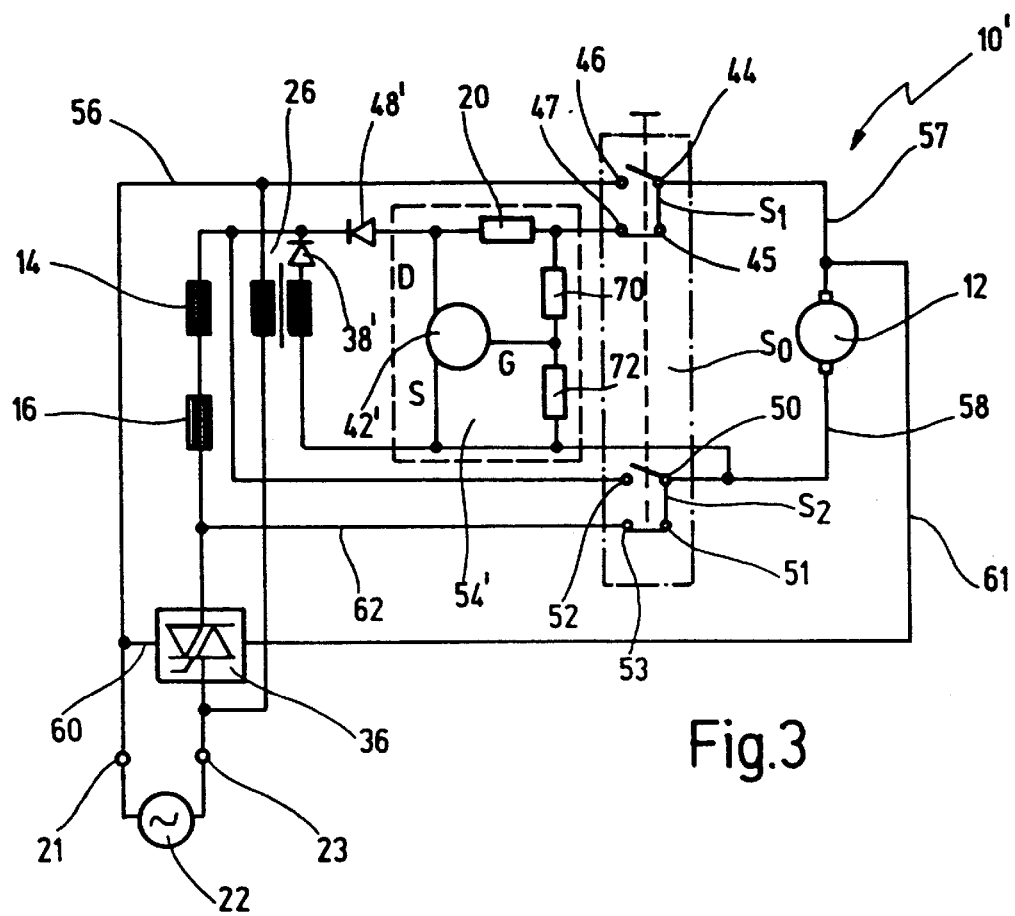
FIG. 3 shows a modified embodiment of the motor in the braking mode according to the present invention.

A modified embodiment of the series wound motor of the present invention is shown in FIG. 3 and generally indicated with the numeral 10'. The circuitry corresponds largely to the embodiment of FIG. 2, but differs mainly in the modified arrangement of the transistor circuit 54', which also includes a fiel-deffect transistor 42'. Corresponding reference numerals are used for corresponding parts. The motor 10' according to FIG. 3 is shown only in the braking mode, while the motor operation mode is not illustrated. In the motor mode, the circuit corresponds completely to that described above in conjunction with FIG. 1.

In the braking mode according to FIG. 3, the motor is separated from the alternating voltage supply 22. The motor is in a closed braking circuit formed by the two field coils 14 and 16 connected in series, the contacts 50, 51 and 53 of the switch $S_2$, the armature 12 with the associated commutator, the contacts 44, 45 and 47 of the switch $S_1$ and the load resistor 20 and the diode 48'. A transformer 26' with its primary winding is again connected to the two poles 21 and 23 of the external voltage supply 22. The secondary side of the transformer 26' is connected to a field coil 14 via a diode 38' and at its other end to a line 58, which connects to the armature 12 and the contact 50 of the switch $S_2$ as well as to the other field coil 16. Both of the diodes 38' and 48' have their cathodes commonly connected to the field coil 14. The anode of the diode 48' is connected to the load resistor 20, whose other end connects to the contact 47 of the switch $S_1$ and to a voltage divider 70, 72. The voltage divider 70, 72 consists of a first resistor 70, for example of 1 kOhm and a second resistor 72, for example of 6 kOhm. One end of the resistor 70 is connected to the contact 47 of the switch $S_1$ and its other end is connected to the resistor 72, which connects to the contact 50 of the switch $S_2$. A Zener diode having the desired voltage could also be provided in place of the resistor 70.

The transistor circuit 54' includes a field-effect transistor of the type IRF 540, its drain D being connected between the anode of the diode 48' and the load resistor 20 and its source connected with the secondary winding of the transformer 26, the resistor 72 and the contact 50 of the switch $S_2$, which is coupled to the armature winding 12 via the line 58. The fiel-deffect transistor 42' is triggered at its gate G by the voltage divider 70, 72 with the voltage taken off at the interconnection of the resistors 70 and 72. In the motor 10 according to FIGS. 1 and 2, the field current (current through the two field coils 14, 16 connected in series) is regulated to a nearly constant value in the braking mode by means of the field-effect transistor 42. In the motor 10' according to FIG. 3, the field current is regulated by the field-effect transistor 42 and the armature voltage is held nearly constant during the braking process, until it finally breaks down at the end of the braking process.

The dimensioning for a motor with a rating of about 2000 Watt and a voltage supply of 230 Volt can be set such that the transformer has a secondary voltage of 4 Volt at a rating of 0.25 Watt. A MOSFET IRF 540 can be used as the field-effect transistor 42', which is designed for a maximal current of 28 Ampere and a maximum power loss of 125 Watt. A resistor of 0.33 Ohm can be employed as the load resistor 20 for a maximum power loss of 10 Watt and the voltage divider, as already mentioned, can comprise the resistor 70 having 1 kOhm and the resistor 72 having 6 kOhm.

During the braking process, the field-effect transistor 42' becomes conductive when a voltage of about 4 Volt between the gate G and the source S arises from the voltage divider 70, 72. Since the voltage on the load resistor 20 falls off, which depends upon the magnitude of the current flowing through the armature winding 12, the armature voltage remains substantially constant in this embodiment and the field current is regulated by the field-effect transistor 42'. At the end of the braking process, the armature voltage falls off so strongly that the field-effect transistor 42' becomes non-conductive, whereby the field current through the field coils 14 and 16 rises again for a short time, so that the braking effect increases at its end.

Figure 4:
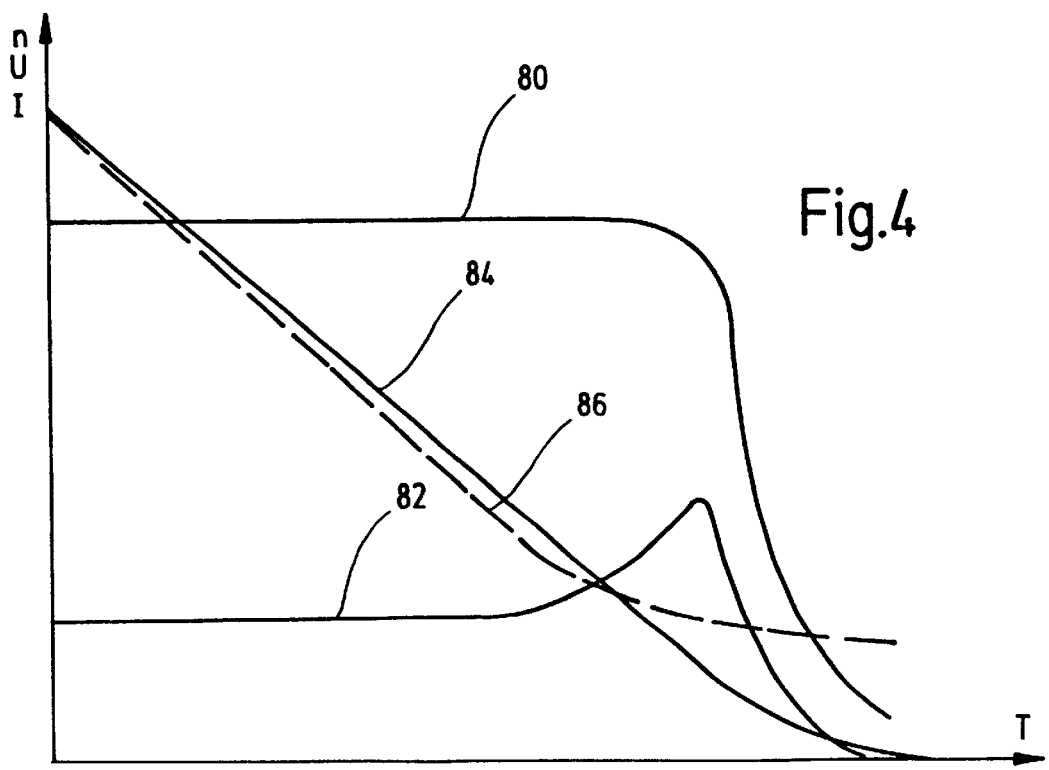
FIG. 4 shows an illustration of the timing of the armature voltage, the current flowing through the field coils and the rotary motor speed during a braking process according to FIG. 3 in comparison to the rotary speed of a conventional motor braked by auto-excitation using commutating poles.

The time behaviour is shown schematically in FIG. 4, where the armature voltage, the field current and the rotary motor speed is plotted as a function of the braking time. For the motor 10' according to FIG. 3, illustrated by the curve 80, a substantially constant armature voltage results during the braking process, which falls off only at the end of braking. As discussed above and illustrated by the curve 82, the field current flowing through the field-coils 14 and 16 is initially almost constant and rises again at the end of the braking process when the field-effect transistor 42' becomes non-conductive. A rapid fall off of the field current follows thereafter. This produces an improved fall off behaviour for the rotary speed, indicated by the curve 84, where a rapid decline of the rotary speed to zero results at the end of braking, which in this case takes place in a little more than 3 seconds.

For comparison, curve 86 illustrates the fall off curve for rotary speed resulting from a conventional motor with autoexcitation and commutating windings as is known for example from EP-B1 0 471 038. As can be seen, a slow continued running of the motor results even after the end of braking.

What is claimed is:

1. A series wound commutator motor, comprising switching means for switching between a motor operation mode and a braking operation mode, wherein in motor operation mode at least one field coil is connected in series with an armature winding in a motor circuit fed with a voltage supply, and wherein in braking operation said at least one field coil and said armature winding form a closed braking circuit separated from the voltage supply, said motor further comprising:
   a mains-driven transformer having a secondary winding which is connected in the braking circuit parallel to said at least one field coil;
   a transistor circuit connected to said transformer in said braking circuit for controlling the current flowing in said braking circuit through the armature winding and the at least one field coil.

2. The motor according to claim 1, further comprising a fiel-deffect transistor having a source, a drain and a gate and being connected with its source and drain in parallel to a load resistor in the braking circuit between the armature winding and the at least one field coil, the field-effect transistor being triggered by a control voltage dependent on a braking current flowing between the source and the gate.

3. The motor according to claim 2, wherein the secondary winding of the transformer is connected to a voltage stabiliser, which is connected in the braking circuit to a current-sensing resistor connected in series with the load resistor for generating a braking current dependent voltage opposite the voltage of the voltage stabiliser between the source and the gate of the field-effect transistor.

4. The motor according to claim 3, wherein the voltage stabiliser comprises a Zener diode having an anode and a cathode, said anode being connected to said at least one field coil, to one end of the secondary winding and to said current-sensing resistor, said cathode being connected to the gate of the field-effect transistor (42) and to one other end of said secondary winding.

5. The motor according to claim 4, further comprising a capacitor being connected in parallel to the Zener diode, and wherein said cathode of said Zener diode is connected to the secondary winding of the transformer via a diode.

6. The motor according to claim 2, further comprising a diode having a cathode and an anode, wherein said cathode is connected to said field-effect transistor and to said current sensing resistor, and wherein said anode is connected with the armature winding within the braking circuit.

7. The motor according to claim 1, further comprising a rectifier which is connected in series between said secondary winding and one pole of said armature winding.

8. The motor according to claim 7, further comprising a protective diode provided between one pole of said armature winding and another end of said secondary winding and said at least one field coil, for providing protection against arcing in said switching means.

9. The motor according to claim 2, wherein said load resistor provided between said source and said drain is configured as a commutating winding.

10. The motor according to claim 1, wherein said transistor circuit comprises a field-effect transistor having a source, a gate and a drain, said source and said drain being connected via a diode in parallel to said at least one field coil, said field-effect transistor regulating a current flowing through the at least one field coil depending on a current flowing through the armature winding, when being in braking mode.

11. The motor according to claim 10, wherein said gate of said field-effect transistor is connected via a voltage divider to both ends of said armature winding.

12. The motor according to claim 11, further comprising a load resistor which is connected in the braking circuit between one end of the armature winding and said at least one field coil via a diode, wherein the drain of the field-effect transistor is connected to one end of said load resistor, and wherein the source of the field-effect transistor is connected with another end of the armature winding and with the at least one field coil.

* * * * *